June 23, 1964 S. G. SIMMS 3,138,208
ROTARY SIDE MOUNTED CULTIVATOR
Filed April 11, 1963 3 Sheets-Sheet 1

INVENTOR.
STANTON G. SIMMS
BY
Kimmel & Crowell
ATTORNEYS.

June 23, 1964  S. G. SIMMS  3,138,208
ROTARY SIDE MOUNTED CULTIVATOR
Filed April 11, 1963  3 Sheets-Sheet 2

INVENTOR.
STANTON G. SIMMS
BY
Kimmel & Crowell
ATTORNEYS.

June 23, 1964 S. G. SIMMS 3,138,208
ROTARY SIDE MOUNTED CULTIVATOR
Filed April 11, 1963 3 Sheets-Sheet 3

INVENTOR.
STANTON G. SIMMS
BY Kimmel & Crowell
ATTORNEYS.

United States Patent Office 3,138,208
Patented June 23, 1964

3,138,208
ROTARY SIDE MOUNTED CULTIVATOR
Stanton G. Simms, 3000 E. Service Road, Ceres, Calif.
Filed Apr. 11, 1963, Ser. No. 272,468
3 Claims. (Cl. 172—38)

The invention described herein relates to cultivating apparatus and particularly to cultivators used in fields where plants are disposed in longitudinally aligned rows.

The primary object of the invention is a cultivator which is extremely simple in operation, requiring no more skill on the part of an operator than the normal skill required to operate a tractor vehicle. The operation of the cultivator is automatic with the exception of its initial starting operation.

Another object of the invention is a cultivator which can be readily secured to or removed from the ordinary farmtype tractor whereby said tractor may be used for other purposes.

A further object of the invention is a cultivator having means to retract the cultivating implement when an obstacle is encountered in the path of travel of the same.

Another object of the invention is a cultivator having means to vertically adjust the same, whereby the degree of cultivation may be predetermined.

A further object of the invention is a cultivator which is simple to manufacture, presents ease of operation and is sturdy in its construction.

Further objects and advantages of the present invention will become readily apparent by referring to the following details and description when taken with the accompanying drawings, wherein.

Figure 1:
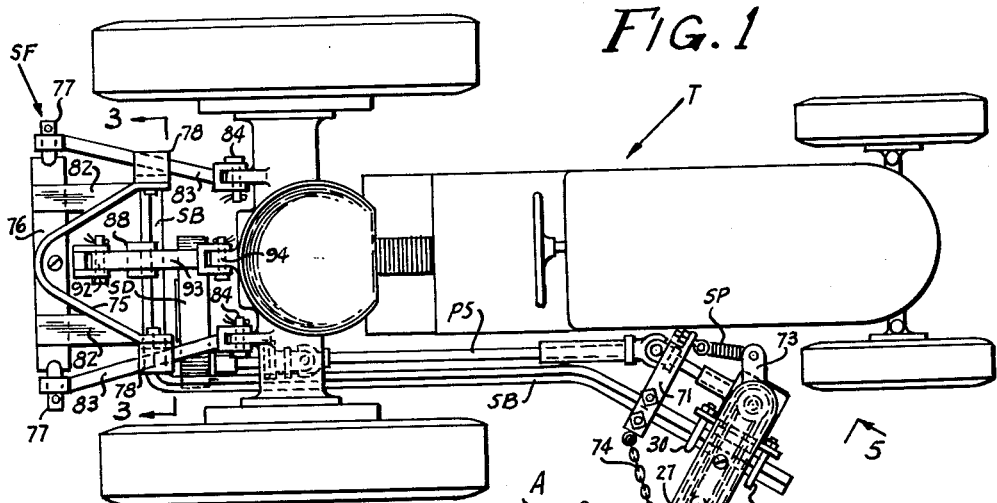
FIGURE 1 is a top plan view of a tractor having associated therewith a cultivator in accordance with this invention.
Figure 8:
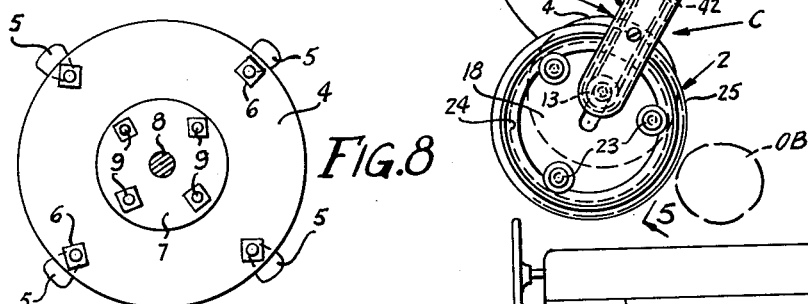
FIGURE 8 is a top view taken on line 8—8 of FIGURE 5 showing the cultivator wheel.
Figure 2:
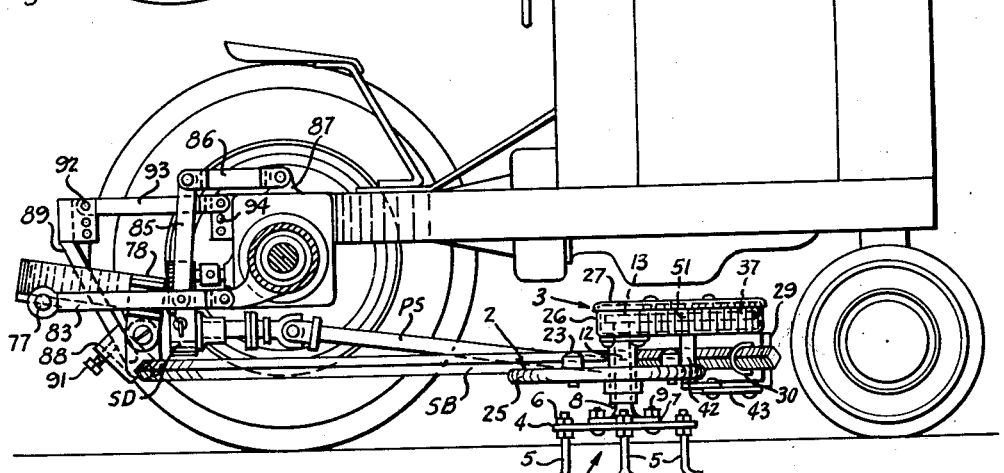
FIGURE 2 is a side elevational view of the embodiment of FIGURE 1.
Figures 3, 4:
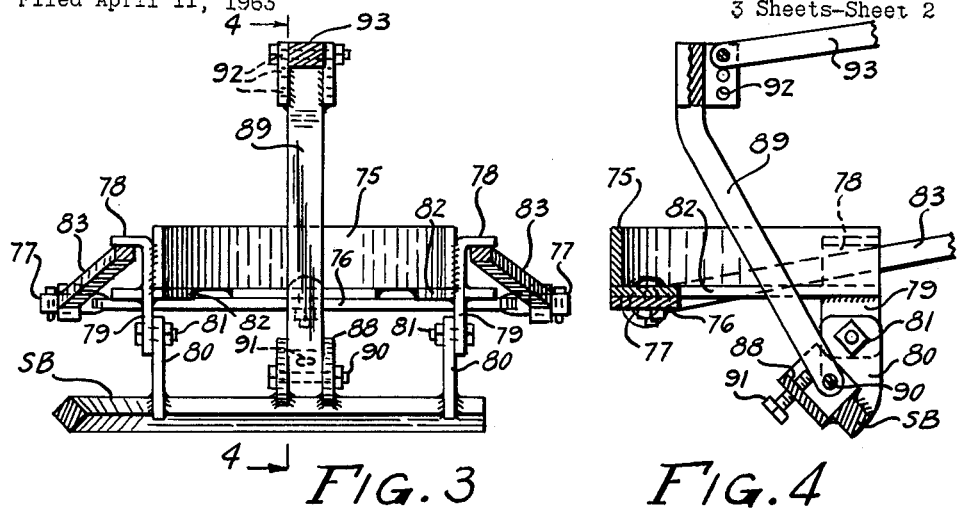
FIGURE 3 is an enlarged cross-sectional view taken on line 3—3 of FIGURE 1.
FIGURE 4 is a fragmentary cross-sectional view taken on line 4—4 of FIGURE 3.

Referring to FIGURES 1 and 2 there is shown a tractor T supporting at one end a support frame SF. A support bar SB supported at one end in the support frame pivotally mounts a cultivator unit C at the other end. When the cultivator unit strikes an obstruction OB it pivots in the direction of the arrow A. When the obstruction has been cleared the unit is returned to normal position by a spring SP. The cultivator unit C is driven from power take-off unit PTO by a power shaft PS.

Figure 5:
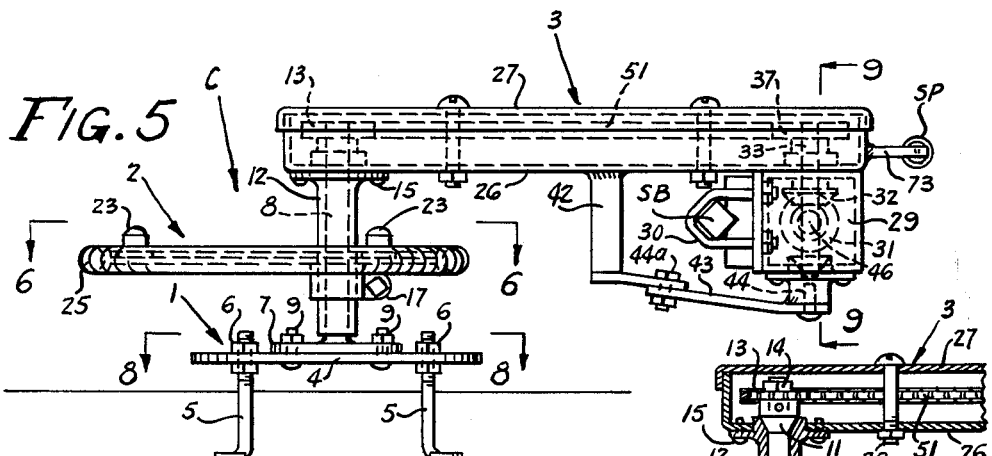
FIGURE 5 is an enlarged fragmentary view taken on line 5—5 of FIGURE 1.
Figures 6, 7:
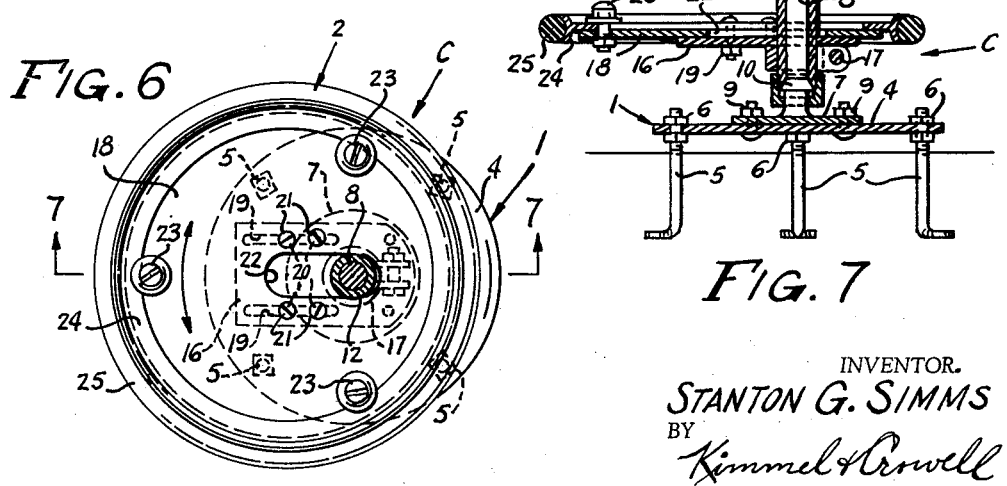
FIGURE 6 is a top cross-sectional view particularly of the bumper wheel and cultivator wheel taken on line 6—6 of FIGURE 5.
FIGURE 7 is a fragmentary cross-sectional view taken on line 7—7 of FIGURE 6.
Figure 9:
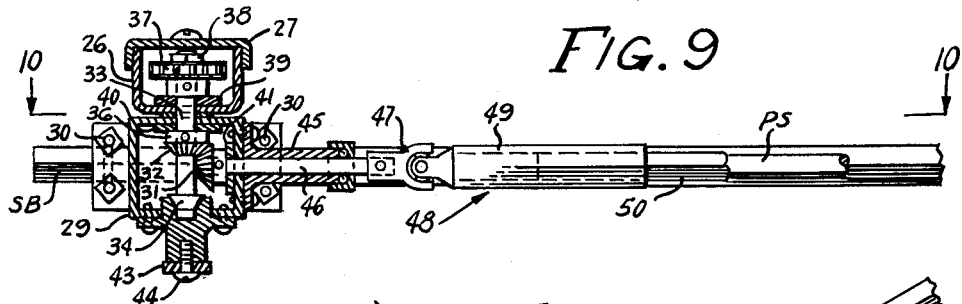
FIGURE 9 is a fragmentary cross-sectional view taken on line 9—9 of FIGURE 5.
Figure 10:
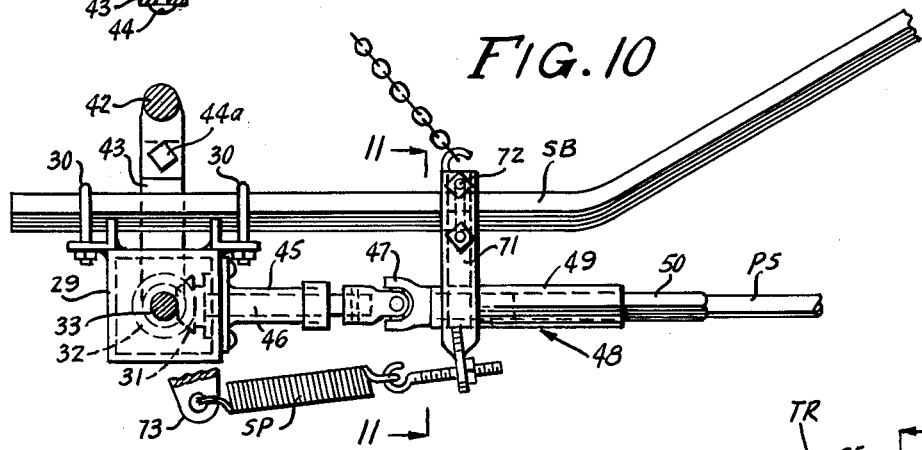
FIGURE 10 is a fragmentary cross-sectional view taken on line 10—10 of FIGURE 9.
Figure 11:
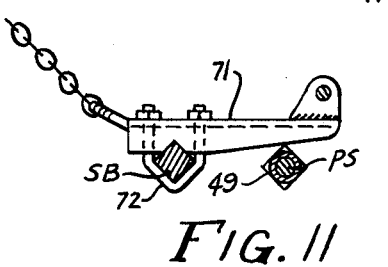
FIGURE 11 is a fragmentary detail view taken on line 11—11 of FIGURE 10.

FIGURES 5, 6 and 7 show details of the cultivator unit.

As can be seen the cultivator comprises an earth-working unit 1, a buffer unit 2, and a support and drive housing 3. The earth-working unit comprises a plate 4 having removably secured thereto earth-working teeth 5 by threaded fasteners 6. The plate 4 is removably secured to a flange 7 of shaft 8 by threaded fasteners 9. The shaft 8 is rotatably supported by bearings 10 and 11 carried in a tubular support 12. The shaft 8 carries a sprocket 13 removably secured to the end thereof by the fastener 14. The tubular support 12 is secured to the housing 3 by threaded fasteners 15.

The buffer unit comprises a support plate 16 clamped to the tubular support 12 by a threaded fastener 17. A circular plate 18 is adjustably mounted on the support plate 16. As seen in FIGURE 6 the support plate 16 is provided with slots 19 and the circular plate 18 is provided with openings 20. Fasteners 21 pass through the slots 19 and openings 20 to hold the plate 18 in adjusted position. A slot 22 in plate 18 receives the tubular support 12. This slot is parallel to slots 19. The plate 18 carries three guide posts 23 to rotatably guide a hoop 24 thereon. The hoop carries a soft buffer 25 made of rubber or a like soft material.

The support and drive housing 3 comprises a support casing 26 and a cover 27 removably secured thereon by threaded fasteners 28. The casing 26 pivots on a gear housing 29 by means which will be described below. The gear housing 29 is secured to the support bar SB by U bolts 30.

Gears 31 and 32 are elements of a transmission for powering the cultivator unit. The shaft 33 is supported in the gear housing by a bearing 34 at one end thereof. An opening 35 through the wall of the gear housing serves as a second bearing. The gear 32 is adjustably mounted on the shaft 33 by collar 36. Sprocket wheel 37 is removably secured to the end of shaft 33 by a threaded fastener 38. Thrust washers 39, 40 and 41 are pressed together by the thrust of fastener 38. A post 42 is fixed to casing element 26. A link 43 is pivotally secured to 29 by a pivotal fastener 44 and it is secured to the post 42 by fasteners 44a. The fastener 44 in the gear supporting shaft 33 cooperates to provide a pivot for the cultivator unit. A sprocket chain 51 drivably connects the sprocket wheels 13 and 37.

Figure 12:
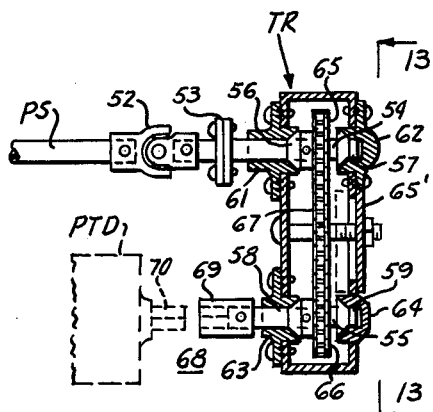
FIGURE 12 is an enlarged fragmentary view, partly in section, of the driving connections to the power take-off of the tractor, the latter element being shown schematically in dotted lines.
Figure 13:
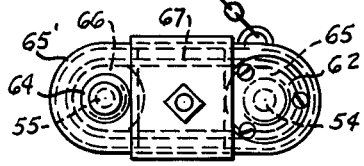
FIGURE 13 is an end view taken substantially on line 13—13 of FIGURE 12.

Gear 31 is secured to stub shaft 46 by collar 45. The stub shaft is connected to universal joint 47 and slip joint 48. The slip joint comprises a socket portion 49 of square shape which receives a shaft portion 50 of the same shape. The power shaft PS is connected to transmission TR by a universal joint 52 and shaft coupling 53 as is clearly seen in FIGURE 12. The transmission comprises shafts 54 and 55 carried in bearings 56, 57, 58 and 59. The bearings are supported in bearing caps 61, 62, 63, 64, respectively, secured to the casing 65′. The shafts 54 and 55 carry sprockets 65 and 66 connected in driving relation by a sprocket chain 67. The shaft 55 is connected to the power take-off of the tractor by a coupling 68 which comprises collar 69 of square section to receive the square shaft 70 of the tractor.

A bracket 71 is removably secured to the support bar by U bolt 72. An ear 73 is fixedly secured to housing member 26. The return spring SP is secured at one end to the ear 73 and at the other end to the bracket 71. A chain 74 is secured to the bracket and to the housing and limits the pivotal movement of the housing under the influence of the spring.

The support frame SF comprises a V bar 75 having fixed there to at the bight portion a bar 76 carrying trunnions 77. The ends of the legs of the V are provided with channel members 78 having depending ears 79. The support bar SB carries upstanding ears 80. The ears 79 and 80 are pivotally connected by pivotal fasteners 81.

Bars 82 rigidly connect the V with bar 76 to provide a rigid structure. Links 83 are pivotally connected to the trunnions 77 and to the tractor by a clevis connection 84. As can be seen in FIGURE 1 the links are bent and pass through channel sections 78. Links 85 are pivotally connected to 83 and to lifting arms 86 which are connected to the lifting mechanism designated generally by the numeral 87. The support bar has secured thereto a mounting channel 88 between the ears 80. A bar 89 is pivotally mounted in the channel by a pivotal fastener 90. An adjusting screw 91 is adjustably mounted in the channel 88 and bears against the bar 89. The bar 89 is provided with openings 92 to selectively pivotally receive a link 93. The tractor body is provided with openings 94 to selectively pivotally receive the other end of the link 93. In operation the litfing arms 86 are powered by the lifting mechanism 87 to raise and lower the links 83 and thereby the support bar.

I claim:

1. The combination of a tractor and a rotary cultivator carried by the rear end of the tractor for cultivating ground around an obstacle or the like, while the tractor moves forward comprising a V-shaped support frame means connected to the rear of the tractor, a generally longitudinally extending support bar means, means including pivoted bracket means connecting said support bar means to said support frame means, pivoted control bar means and linkage means interconnecting the rear portion of said support bar means to said tractor, a cultivator unit laterally mounted on the front portion of said support bar means disposed adjacent the front portion of the tractor, power take-off means including shaft means, universal joint means and gear means connected to the rear of said tractor and said cultivator unit, said cultivator unit comprising a second gear means connected to said power take-off means and a support housing means including a lateral drive means operably connected to said second gear means, said support housing means being pivotally mounted on the front portion of said support bar means, an earth working unit mounted on a vertical shaft means including buffer means in support bearing means on said support housing means, said lateral drive means operatively connecting said earth working unit to said second gear means, radial lever means fixedly connected to said support housing means, bracket means and spring bias means interconnecting said radial lever means to said support bar means to automatically accommodate said earth working unit to various obstructions in the line of travel of the tractor.

2. The combination of a tractor and a rotary cultivator as in claim 1 wherein said buffer means includes an adjustable rotary and eccentric buffer unit operatively secured on said vertical shaft means and cooperating with said earth working unit during cultivation of soil around obstacles and the like.

3. The combination of a tractor and a rotary cultivator carried by the rear end of the tractor for cultivating ground around an obstacle or the like, while the tractor moves forward, comprising a support frame means connected to at least three points of the rear of the tractor, a generally longitudinally extending support bar means, means including pivoted bracket means connecting said support bar means to said support frame means, pivoted control bar means and linkage means interconnecting the rear portion of said support bar means and said tractor; said support frame comprising a V-shaped bar, a bar means secured to the bight of the V-shaped bar, trunnion means carried by said bar means, channel means carried by each leg of the V-shaped bar, pivotally mounted link means pivotally connecting said trunnions and tractor adapted to be engaged in the channel means, power operated lift links connected to said link means, said control bar means and linkage means being adapted to be operatively mounted between said channel means intermediate the V-shaped opening between the legs of said V-shaped bar, a base bar of said control bar means and linkage means pivotally connected to said support bar means by a channel connection fixedly secured to said support bar means, an adjusting screw threaded in said channel connection of said linkage means and adjustably bearing against said base bar means pivotally connected by said control bar means and linkage means to the tractor, a cultivator unit mounted on the front portion of said support bar means longitudinally disposed adjacent the front of the tractor, rear power take-off means from the tractor connected by power shaft means, universal joint means and gear housing means to said cultivator unit, said cultivator unit including a rotary earth working unit including a rotary buffer means, lateral drive means and support housing means pivotally connecting said earth working unit to said gear housing on said support bar means, radial lever means fixedly connected to said support housing means, and spring bias means interconnecting said radial lever means to said support bar means which will automatically accommodate said cultivator unit to various obstructions in the line of travel of the cultivator unit during cultivation of the soil.

References Cited in the file of this patent

UNITED STATES PATENTS

| | | |
|---|---|---|
| 2,295,898 | Hollis | Sept. 15, 1942 |
| 2,473,357 | Blunier | June 14, 1949 |
| 2,489,633 | Fulgham | Nov. 29, 1949 |
| 2,531,557 | Dayton | Nov. 28, 1950 |
| 2,616,348 | Ariens | Nov. 4, 1952 |
| 2,748,679 | Rogers | June 5, 1956 |
| 2,791,081 | Allen et al. | May 7, 1957 |
| 2,815,632 | Dort | Dec. 10, 1957 |
| 2,826,129 | Olson | Mar. 11, 1958 |
| 3,059,704 | Kasatkin | Oct. 23, 1962 |

FOREIGN PATENTS

| | | |
|---|---|---|
| 1,186,254 | France | Feb. 23, 1959 |